Dec. 24, 1968    J. E. ROCHTE ET AL    3,418,080
SAMPLE TRANSPORT SYSTEM

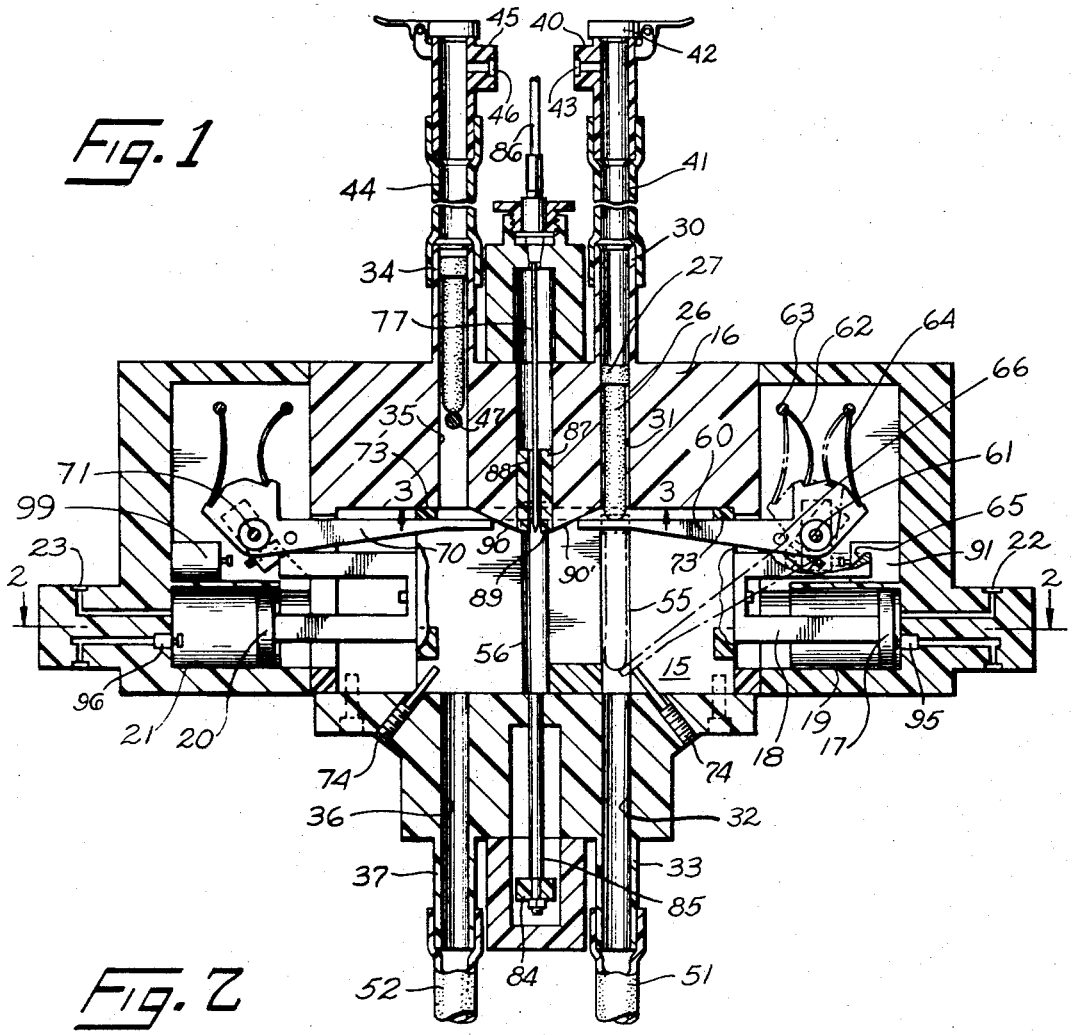

Filed Oct. 26, 1964    4 Sheets-Sheet 2

INVENTORS.
JERRY EDWARD ROCHTE
DONALD N. MARTIN

BY THEIR ATTORNEYS
HARRIS, KIECH, RUSSELL & KERN

Dec. 24, 1968  J. E. ROCHTE ET AL  3,418,080
SAMPLE TRANSPORT SYSTEM
Filed Oct. 26, 1964  4 Sheets-Sheet 3
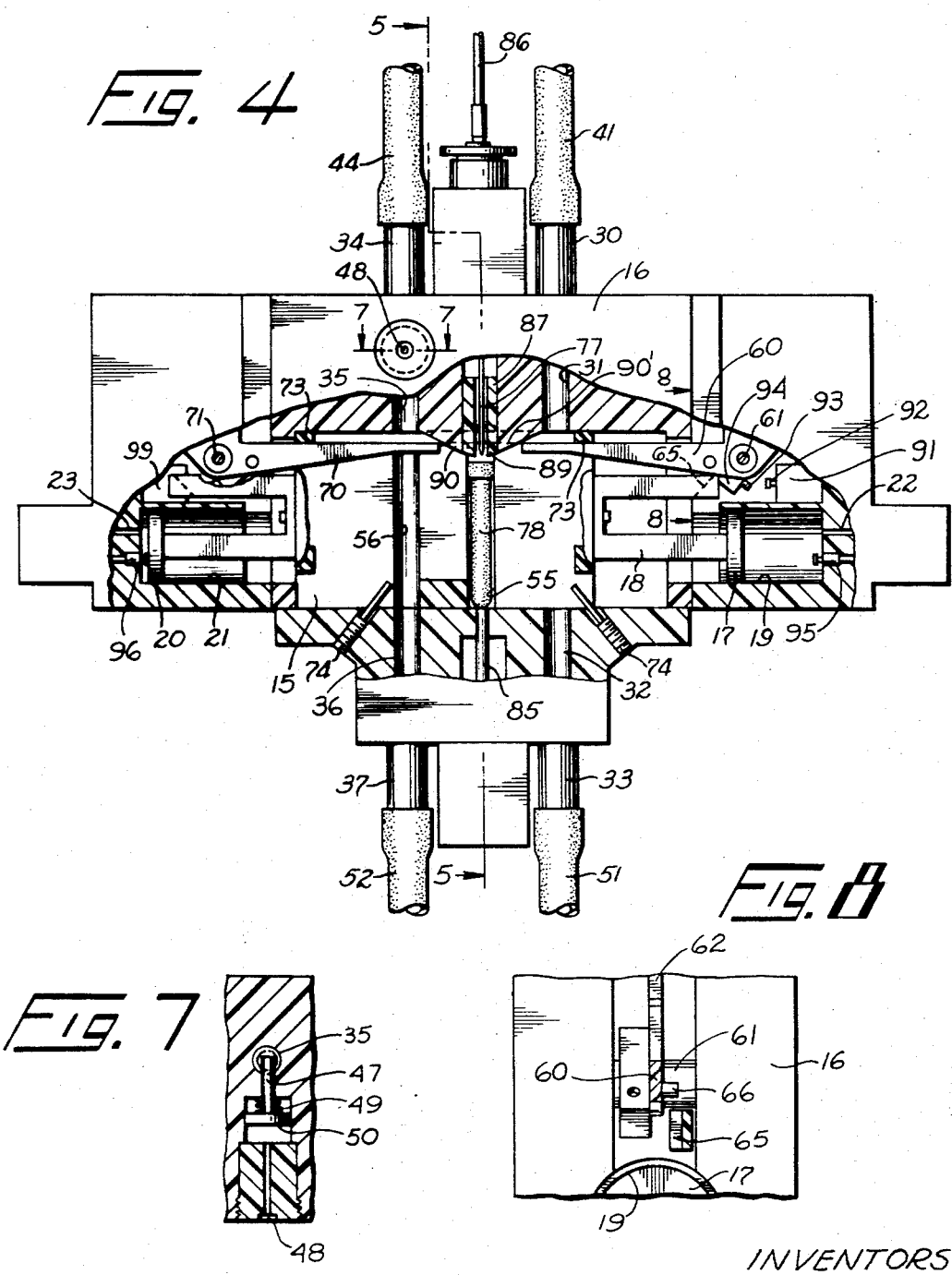
INVENTORS.
JERRY EDWARD ROCHTE
DONALD N. MARTIN
BY THEIR ATTORNEYS
HARRIS, KIECH, RUSSELL & KERN

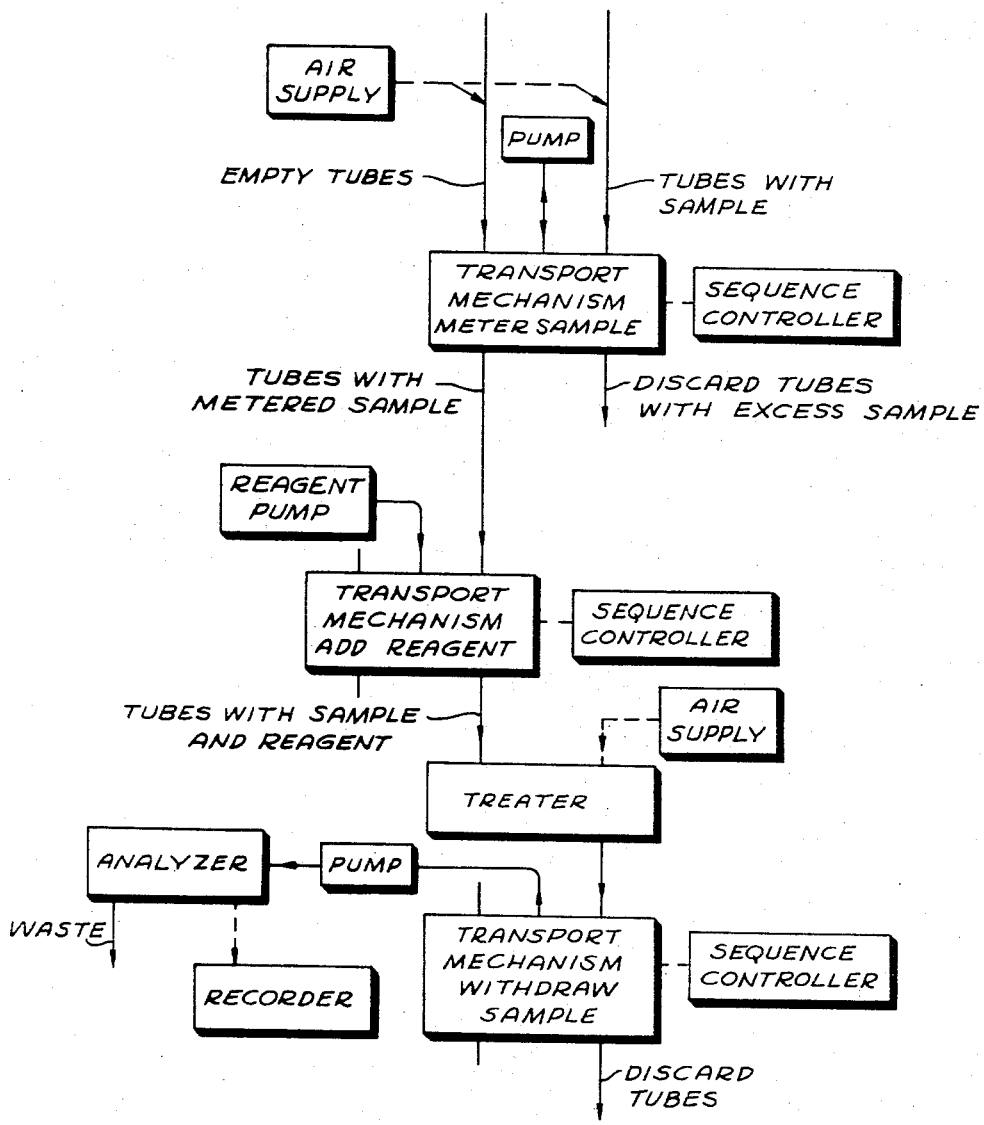

United States Patent Office 3,418,080
Patented Dec. 24, 1968

3,418,080
SAMPLE TRANSPORT SYSTEM
Jerry Edward Rochte, Long Beach, and Donald Norman Martin, Whittier, Calif., assignors to Beckman Instruments, Inc., a corporation of California
Filed Oct. 26, 1964, Ser. No. 406,367
18 Claims. (Cl. 23—259)

ABSTRACT OF THE DISCLOSURE

Sample handling system for wet chemical analyzers in which one or more sample tubes are transported through a wet chemical analyzer by pneumatic means to various stations where various procedures, such as, withdrawing or inserting samples, adding reagents and/or treating the sample, withdrawing the treated sample and transporting the same to an analyzer, may be performed. Also, specific pneumatically operated mechanism for transporting the sample tube or tubes within the various stations to positions where the sample may be withdrawn, inserted into the tube, and/or reagents added thereto or transferred to treating stations.

---

This invention relates to sample handling systems and, in particular, to a system which permits automatic transportation and manipulation of samples for analysis and the initial insertion of the sample.

In a typical wet chemical analysis, a sample to be analyzed is obtained in a container or tube, the technician transfers a measured amount of the sample into a beaker, adds a measured amount of a reagent, mixes the materials and usually performs some treatment such as heating at a particular temperature for a definite period of time. A portion of the treated mixture is then transferred to an analyzer instrument, such as a colorimeter, a reading is taken and recorded and the concentration or other characteristic being determined is calculated.

It is an object of the present invention to provide a system for handling a sample during a chemical analysis and, in particular, for automatically transporting a sample from one operating station to another and for manipulating the sample at an operating station. An additional object to provide such a system which may be utilized for performing a wide variety of operations as required in various analyses.

It is a particular object of the invention to provide a sample handling system in which the samples and various mixtures are handled in closed containers. A further object is to provide such a system in which the closed containers or tubes are moved by pneumatic lines after initial insertion into the system. An additional object of the invention is to provide a sample handling system in which the various steps performed are under the control of the mechanism itself so that an operation is initiated after completion of the preceding operation. A specific object is to provide such a system in which the entire analysis cycle is initiated by insertion of a sample tube.

It is an object of the invention to provide a system for handling samples in closed tubes and including a first pneumatic line for moving a closed tube therethrough, a second pneumatic line for moving a closed tube therethrough, first means for withdrawing a quantity of fluid from a closed tube and for inserting a quantity of fluid into a closed tube, and second means for moving a tube from the first line to the first means and return and for moving a tube from the second line to the first means and return. Further objects include the provision of such systems with only a single pneumatic line and with only the withdrawal of a fluid or the insertion of a fluid as determined by the particular analysis to be performed.

An additional object is to provide an instrument incorporating a plurality of such systems for performing a series of manipulations seriatim with the closed tubes being transferred from one system to another via the pneumatic lines and with various conventional treatment stages and analyzer stages introduced as desired.

It is an object of the invention to provide a mechanism for handling samples in closed tubes including a housing, a tube carriage slidably mounted in the housing for reciprocation between a first position and a second position and including first and second tube passages therethrough, with the housing having a third tube passage aligned with the first tube passage when the carriage is in the first position and a fourth tube passage aligned with the second tube passage when the carriage is in the second position, needle means mounted in the housing for entering a closed tube, and drive means mounted in the housing for moving a tube when in the sampling position into engagement with the needle means. A further object is to provide such a structure including a control lever pivotally mounted in the housing for each housing tube passage with the lever blocking a tube passage of the carriage when in one position and retaining a tube in the carriage tube passage when in a second position. A particular object is to provide a control for such lever such that the light impact of an incoming tube will actuate the lever to provide a greatly increased force at the end of the lever motion for producing subsequent control signals.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

FIG. 1 is a sectional view of a preferred form of transport mechanism for use in the system of the invention showing the device in the initial stage;

FIG. 2 is a sectional view taken along the line 2—2 of FIG. 1;

FIG. 4 is a view similar to that of FIG. 1 showing the device in an intermediate stage;

FIG. 7 is a partial sectional view taken along the line 7—7 of FIG. 4;

FIG. 8 is an enlarged partial sectional view taken along the line 8—8 of FIG. 4; and FIG. 9 is a flow diagram illustrating the sample handling system of the invention.

Figure 5:
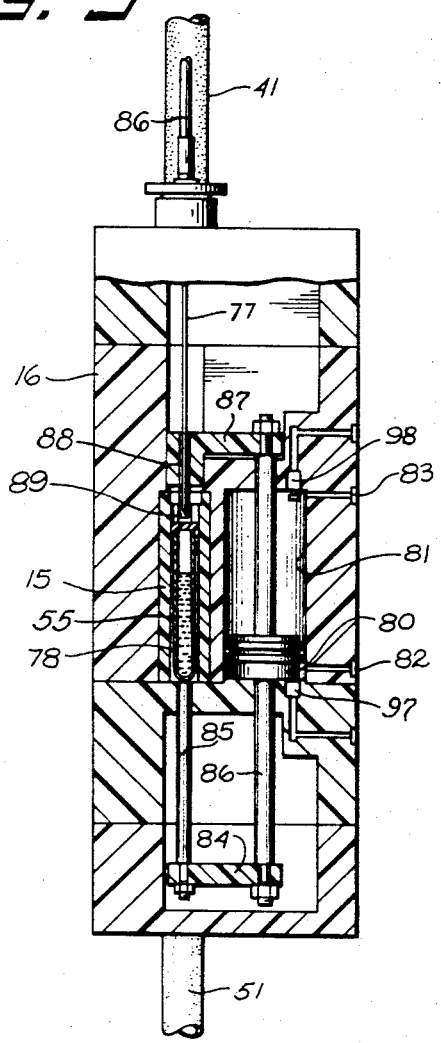
FIG. 5 is a sectional view taken along the line 5—5 of FIG. 4.

A carriage 15 is mounted in a housing 16 for reciprocation between the position of FIG. 1 and the position of FIG. 4. The carriage is free floating in the housing and means are provided for moving the carriage to the desired position and typically may include a piston 17 with arm 18 engaging the carriage and riding in cylinder 19 of the housing and a similar piston 20 riding in a cylinder 21. The carriage is moved to the left by introducing air under pressure at passage 22 and is moved to the right by introducing air under pressure at passage 23. It should be noted that the mechanism described herein is a pneumatically operated one but that electrically operated or mechanically operated mechanisms can be substituted if desired.

The various materials such as samples and sample-reagent mixtures are carried through the system in closed tubes travelling in pneumatic lines. A typical closed tube is shown in FIG. 1 and comprises a plastic test tube 26 with a rubber cap 27 closing the upper end thereof. Tube flow paths are provided through the housing 16 and typically may comprise a projecting tube 30, a flow passage 31, another passage 32, and a projecting tube 33. A parallel path may include a projecting tube 34, a passage 35, another passage 36, and a projecting tube 37. The transport mechanism of FIG. 1 may be connected to other units of the over-all system by means of pneumatic lines, typically flexible plastic tubing, with the closed tubes being moved therethrough by air under pressure introduced at the inlet end of the line.

In the device illustrated in FIG. 1, the extension 30 is connected to an inlet mechanism 40 by a length of tubing 41. A spring loaded cap 42 may be raised for insertion of a closed tube containing a sample and a source of air under pressure is connected at the passage 43. A supply of closed empty tubes is provided at the extension 34 via tubing 44 and inlet device 45, with air under pressure supplied at the passage 46. Movement of empty tubes through the passage 35 is controlled by a spring loaded plunger 47 (FIG. 7) which is normally pushed into the passage by air under pressure at the opening 48 compressing the spring 49 by acting on the face of the piston 50. An outlet line 51 is connected to the extension 33 and leads to a waste receptacle or in some cases to another analyzer system. Another outlet line 52 is connected to the extension 37 and leads to another unit of the system.

Tube passages 55, 56 are provided in the carriage 15, with the passage 55 aligned with the housing passages 31, 32 when the carriage is to the right as seen in FIG. 1, and with the passage 56 aligned with the passages 35, 36 when the carriage is to the left as seen in FIG. 4.

A lever 60 is pivotally mounted in the housing on a pin 61 and moves between an up position shown in solid lines in FIG. 1 and a down position shown in phantom lines. The lever 60 is bistable and includes a drive mechanism for urging it to one of the two positions. A leaf spring 62 is pivotally mounted in the housing by a pin 63 at one end and engages the lever at the other end. Another spring 64 is similarly mounted. When in the solid line position of FIG. 1, the spring 64 urges the lever clockwise while the spring 62 is on center and exerts very little torque on the lever. A slight counterclockwise movement of the lever brings the spring 62 into action so that a torque is transmitted to the lever, reaching a maximum when the lever is in the down position. The initial movement of the lever may be produced by the weight of a sample tube at the outer end thereof. When in the down or phantom line position, the spring 64 is substantially on center and exerts very little torque. The lever is moved to the up position by engagement of a surface 65 of the carriage 15 with a pin 66 of the lever as the carriage moves to the left. A slight clockwise rotation from the down position brings the spring 64 into action and snaps the lever to the up position. This bistable spring arrangement enables the lever to deliver at the end of its downward motion, a force many times that required to start the downward movement. In one embodiment a force increase by a factor of about twenty is achieved.

A similar lever 70 is mounted in the housing on a pin 71. A slot 72 in the carriage 15 provides a clearance for lever motion. The up position of a lever is controlled by a bar 73 on the carriage and the down position is controlled by a set screw 74 positioned in the housing. When the lever 60 is in the up position, the inlet of the tube passage 55 of the carriage is blocked and when the lever is in the down position, a tube is retained in the tube passage. The lever 70 operates in a similar manner in conjunction with the tube passage 56.

A hypodermic-type needle 77 is mounted in the housing 16 and means are provided for moving a closed tube positioned in the carriage 15 into and out of engagement with the needle 77. Referring to FIGS. 4 and 5 which show the carriage to the left with a tube 78 in the passage 55 in line with the needle 77, this will be referred to as the sampling position for the tube. The specific embodiment illustrated includes a mechanism for raising the tube upward into engagement with the needle so that the needle pierces the tube cap and for moving the tube downward off of the needle. In an alternative arrangement, the needle could be moved downward to engage the tube and upward to move out of the tube.

Figure 6:
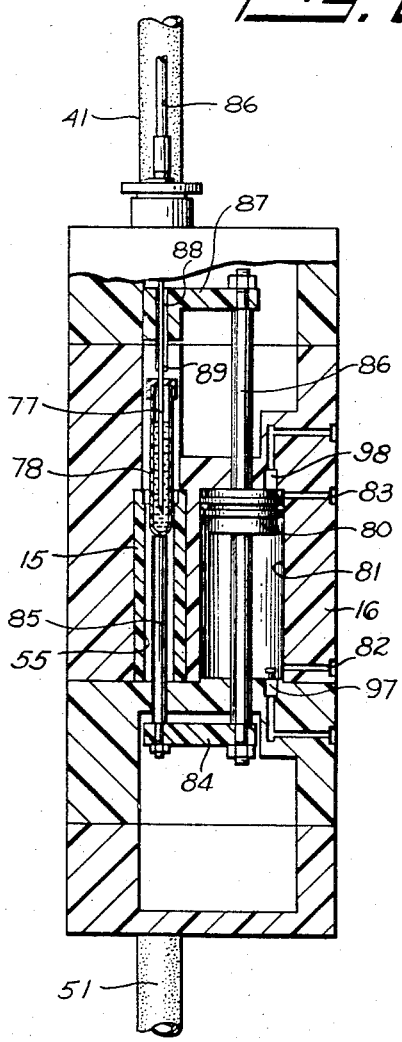
FIG. 6 is a view similar to that of FIG. 5 showing the closed tube in the raised position.
Figure 3:
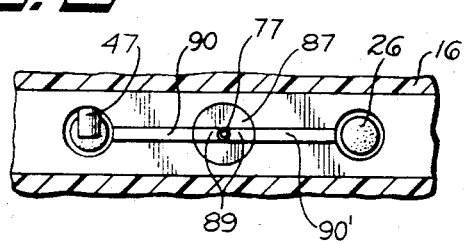
FIG. 3 is an enlarged partial sectional view taken along the line 3—3 of FIG. 1.

A piston 80 (FIG. 5) rides in a cylinder 81 of the housing and is moved upward by introduction of air under pressure at passage 82 and downward by introduction of air under pressure at passage 83. An arm 84 supports a shaft 85 parallel to the piston shaft 86. The upper end of the shaft 85 is normally positioned at the lower surface of the carriage 15. When the piston 80 is moved upward to the position of FIG. 6, the shaft 85 engages the lower end of the tube 78 and pushes it upward onto the needle 77. The needle is connected by a hose 86 to a suitable pump or other apparatus for withdrawing fluid from the tube or for introducing fluid into the tube. An arm 87 is carried at the upper end of the piston shaft 86 and the needle passes through an opening 88 at the outer end of the arm. Downward movement of the piston 80 brings the arm 87 into engagement with the cap of the tube 78 and moves the tube downward to the position of FIG. 5. The lower end 89 of the arm 87 is aligned with ribs 90, 90' of the housing (FIGS. 3 and 4) when the piston 80 is in the down position. The ribs 90, 90' and end 89 serve as a guide to position tubes vertically as they are moved to the central sampling position by the carriage.

The various motions of the transport mechanism described above are produced by introducing air under pressure at appropriate inlet passages at the desired times. The particular sequence of operations can be varied by controlling the application of air pressure. In a preferred arrangement for the system, the sequence of events in a transport mechanism is controlled automatically by a sequence controller unit which typically may be a motor driving a set of cams which open and close valves in a predetermined sequence. Of course, more sophisticated sequence controllers can be utilized such as electrical switching circuits, electric or pneumatic logic circuits, programmed computer control and the like. Alternatively, the control could be entirely manual through operation of a series of levers or the like.

The embodiment illustrated herein incorporates a plurality of control switches which function to provide a positive interlock by preventing execution of a step in the sequence until the preceding step has been completed. A typical control switch is indicated at 91 of FIG. 4. A plunger 92 of the switch 91 is depressed by engagement with a set screw 93 carried in a block 94 affixed to the lever 60. When the lever 60 is in the up position of FIG. 4, the plunger 92 is extended. When the lever 60 is moved to the down position as shown in phantom lines in FIG. 1, the plunger 92 is depressed. Similar control switches are shown at 95 and 96 for operation by pistons of the carriage, at 97, 98 for operation by the piston 80, and at 99 for operation by the lever 70. These control switches may be electrical switches which open and close appropriate electrical contact sets for control of the sequence controller unit and can be used to start and stop the cam drive motor of a cam-type sequence controller. In an alternative arrangement, the control switches may be pneumatic in nature and may be pressure release valves similar to those used in automobile tires where depression of the plunger provides an exhaust to the ambient atmosphere. The pneumatic type of control switch may be used for the control of valves in the manner disclosed in the copending application of Rochte, Bistable Pneumatic Logic Element and Valves, Ser. No. 322,879, filed Nov. 12, 1963, and now Patent No. 3,322,148, and assigned to the same assignee as the present application.

The transport mechanism may be used to transfer a predetermined amount of sample from a tube containing a quantity of a sample to an empty tube. The mechanism is initially at rest in the position of FIG. 1 with at least one closed empty tube in the line 44. The technician places a quantity of sample in a tube, caps the tube and inserts the tube at the inlet 40 of the line 41. The pneumatic lines moves the tube into the passage 31 into engagement with the lever 60. Impact of the sample tube on the lever triggers the lever to pivot counterclockwise to the down position dropping the sample tube into the passage 55 of the carriage. Movement of the lever 60 also actuates the switch 91 to initiate the sequence of operations. In the next step, air is admitted under pressure at passage 22 to move the carriage 15 to the left to the position of FIG. 4 and to engage and move the lever 60 to the up position. At the end of the carriage movement, the switch 96 is actuated, providing a signal indicating that the carriage movement has been completed and to initiate the next step. Air is now admitted under pressure at passage 82, raising the piston 80 and the sample tube from the position of FIG. 5 to the position of FIG. 6, with the needle 77 piercing the tube cap and projecting into the fluid in the tube. At the upper end of the stroke, the switch 98 is actuated.

A metering pump is connected to the line 86 of the needle 77. After the needle is inserted into the sample tube, the pump is energized to withdraw a predetermined amount of sample from the tube. At the completion of the withdrawal operation by the pump, a control signal is produced for initiating the next operation which is application of air under pressure at the passage 83 to lower the piston 80 and the sample tube from the position of FIG. 6 to the position of FIG. 5. At the completion of this operation, the switch 97 is actuated.

In the next step, an empty tube is released by bleeding air from the passage 48 (FIG. 7), permitting the tube to drop onto the lever 70. The lever 70 is pivoted clockwise dropping the tube into the passage 56 of the carriage. Pivoting of the lever also actuates the switch 99 indicating completion of this step. In the next step, air under pressure is applied to the passage 23 to move the carriage to the right back to the position of FIG. 1. The tube from which the metered amount of sample has been withdrawn is now in line with the passage 32 of the housing below lever 60 and is moved downward in the pneumatic line by the air pressure at the inlet end of the line. Ordinarily this tube will be transported to a waste receptacle but could be transported to another unit for a subsequent operation. Movement of the carriage to the right also moves the lever 70 from the down position to the up position and places the closed empty tube under the needle. The carriage movement also actuates the switch 95.

In the next three steps, the empty tube is raised to pierce the cap and position the needle within the tube, the metering pump is operated in the reverse direction to introduce the measured amount of sample into the empty tube, and the tube is lowered from the needle.

The carriage is again moved to the left positioning the tube carrying the metered amount of sample in the pneumatic line and this tube is moved out through the passage 36 into the line 52 for transport to the next unit. The carriage is moved to the right back to the position of FIG. 1 and the sequence of operation is terminated, leaving the mechanism ready for receiving another tube containing a sample to be metered into an empty tube.

The transport mechanism may be utilized to perform other operations such as addition of a metered amount of reagent to a tube containing a metered amount of sample, and the withdrawal of a metered amount of the contents of a tube for transport to another unit. In these operations, the line 34–37 and the lever 70 are not required since empty tubes are not utilized. The transport mechanism can be used for filling empty tubes and for adding fluid to tubes containing dry samples. It can also be used for handling tubes for capping, puncturing, marking, heat sealing and similar operations with the appropriate operation mechanism substituted for the needle 77 and associated pump.

FIG. 9 is a flow diagram illustrating the use of a plurality of the transport mechanisms in the system of the invention to provide an analysis, typically the colorimetric determination of glucose in blood serum. The technician fills a tube with serum, caps it, and inserts it into the inlet of the sample pneumatic line. The tube moves to the meter sample transport mechanism and a metered quantity of serum is transferred into an empty tube in the manner described above. The original tube containing the excess serum is discarded and the tube with the metered amount of sample is carried by the pneumatic line on to a second transport mechanism. Arrival of the tube at the second transport mechanism initiates the sequence of operations by which the tube is moved in the carriage to the sampling position, is raised to engage the needle, a metered amount of reagent is pumped into the tube, the tube is lowered and returned to the pneumatic line. While the same transport mechanism that is used for metering a sample can be used for adding reagent, it is seen that all of the steps in the operation are not required.

The tube containing the sample and reagent is moved on to a treater and then to a third transport mechanism. The treater may perform any of the necessary analysis functions and for the blood serum example, would be an incubator in which the mixture is maintained at a predetermined temperature for a predetermined period of time. Typically the treater would comprise a rotating disc having a plurality of axially disposed passages at its periphery. The incoming tube line is disposed to deposit tubes in the passages as the passages of the disc move past the end of the line. Subsequently, the disc passage containing the tube is moved into the outgoing line and the tube is blown along the line to the next unit. The rotating disc is housed in a temperature controlled oven and the time of treatment is controlled by the speed of rotation of the disc and the angular position between the inlet and outlet pneumatic lines.

At the third transport mechanism, a metered amount of sample is withdrawn from the tube and pumped on to a colorimeter cell of an analyzer. The tube with the remainder of the mixture is discarded. The colorimeter reading is recorded, the cell contents are discarded and the analyzer is ready for receiving another metered sample-reagent mixture. It will be clear to those skilled in the analysis field that the system described herein may be utilized for performing a wide variety of analyses and is not limited to the particular analysis described.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a system for handling samples in closed tubes, the combination of:
   a first pneumatic line for moving a closed tube therethrough;
   a second pneumatic line for moving a closed tube therethrough;
   first means for withdrawing a quantity of fluid from a closed tube and for inserting a quantity of fluid into a closed tube; and
   second means for moving a tube from said first line to said first means and return and for moving a tube from said second line to said first means and return.

2. In a system for handling samples in closed tubes, the combination of:
   a pneumatic line for moving a closed tube therethrough;

first means for withdrawing a quantity of fluid from a closed tube and for inserting a quantity of fluid into a closed tube; and second means for moving a tube from said line to said first means and return.

3. In a system for handling samples in closed tubes, the combination of:

a pneumatic line for moving a closed tube therethrough;

first means for withdrawing a quantity of fluid from a closed tube; and second means for moving a tube from said line to said first means and return.

4. In a system for handling samples in closed tubes, the combination of:

a pneumatic line for moving a closed tube therethrough;

first means for inserting a quantity of fluid into a closed tube; and second means for moving a tube from said line to said first means and return.

5. In a system for handling samples in closed tubes, the combination of:

a plurality of pneumatic lines for moving closed tubes therethrough;

first means for withdrawing a quantity of fluid from a closed tube and for inserting a quantity of fluid into a closed tube; and second means for moving a tube from a pneumatic line to said first means and for moving a tube from said first means to a pneumatic line.

6. In a system for handling samples in closed tubes, the combination of:

a first pneumatic line for moving a closed tube therethrough;

a second pneumatic line for moving a closed tube therethrough;

first means for withdrawing a quantity of fluid from a closed tube and inserting a quantity of fluid into a closed tube;

second means for moving a tube from said first line to said first means and return and for moving a tube from said second line to said first means and return;

third means for inserting a quantity of fluid into a closed tube;

fourth means for moving a tube from said second line to said third means and return;

fifth means for withdrawing a quantity of fluid from a closed tube; and sixth means for moving a tube from said second line to said fifth means and return.

7. In a system for handling samples in closed tubes, the combination of:

a pneumatic line for moving a closed tube therethrough;

first means for inserting a quantity of fluid into a closed tube;

second means for moving a tube from said line to said first means and return;

third means for withdrawing a quantity of fluid from a closed tube; and fourth means for moving a tube from said line to said third means and return.

8. In a system for handling samples in closed tubes, the combination of:

a pneumatic line for moving a closed tube therethrough;

first means for inserting a quantity of fluid into a closed tube;

second means for moving a tube from said line to said first means and return;

third means for withdrawing a quantity of fluid from a closed tube;

fourth means for moving a tube from said line to said third means and return;

a treating unit connected in said line between said second and fourth means for receiving, treating and dispatching a tube and contents; and an analyzer unit connected to said third means for receiving and analyzing fluid from a tube.

9. In a system for handling samples in closed tubes, the combination of:

a first pneumatic line for moving a closed tube therethrough;

a second pneumatic line for moving a closed tube therethrough;

first means for withdrawing a quantity of fluid from a closed tube and for inserting a quantity of fluid into a closed tube;

second means for moving a tube from said first line to said first means and return and for moving a tube from said second line to said first means and return;

a sequence controller for actuating said first and second means in a predetermined sequence to provide a predetermined series of sample handling operations; and a plurality of switch means for initiating action by said sequence controller with each switch means actuated by one of said first and second means at the completion of an operation.

10. In a mechanism for handling samples in closed tubes, the combination of:

a housing;

a tube carriage slidably mounted in said housing for reciprocation between a first position and a second position, said carriage including first and second tube passages therethrough, said housing including a third tube passage aligned with said first tube passage when said carriage is in said first position and a fourth tube passage aligned with said second tube passage when said carriage is in said second position, with the unaligned carriage passage in a sampling position;

needle means mounted in said housing for entering a closed tube;

a tube drive mounted in said housing for moving a tube from a carriage tube passage in said sampling position into engagement with said needle means and return;

a first lever pivotally mounted in said housing and movable through said carriage, with said lever blocking said first tube passage when in a first position and retaining a tube in said first tube passage when in a second position; and a second lever pivotally mounted in said housing and movable through said carriage, with said lever blocking said second tube passage when in a first position and retaining a tube in said second tube passage when in a second position.

11. In a mechanism for handling samples in closed tubes, the combination of:

a housing;

a tube carriage slidably mounted in said housing for reciprocation between a first position and a second position, said carriage including first and second tube passages therethrough, said housing including a third tube passage aligned with said first tube passage when said carriage is in said first position and a fourth tube passage aligned with said second tube passage when said carriage is in said second position, with the unaligned carriage passage in a sampling position;

needle means mounted in said housing for entering a closed tube;

a tube drive mounted in said housing for moving a tube from a carriage tube passage in said sampling position into engagement with said needle means and return;

a first lever pivotally mounted in said housing and movable through said carriage;

a snap action lever drive for said first lever for urging said lever to a first position and to a second position, with said first lever blocking said first tube passage when in a first position and retaining a tube in said first tube passage when in a second position;

a second lever pivotally mounted in said housing and movable through said carriage; and a snap action lever drive for said second lever for urging said lever to a first position and to a second position, with said second lever blocking said second tube passage when in a first position and retaining a tube in said second tube passage when in a second position, said carriage including means for engaging each of said levers to move the lever from the second position to the first position as said carriage slides, and with each of said levers being moved from the first position to the second position by impact of a tube.

12. In a mechanism for handling samples in closed tubes, the combination of:

a housing;

a tube carriage slidably mounted in said housing for reciprocation between a first position and second position, said carriage including first and second tube passages therethrough, said housing including a third tube passage aligned with said first tube passage when said carriage is in said first position and a fourth tube passage aligned with said second tube passage when said carriage is in said second position, with the unaligned carriage passage in a sampling position;

needle means mounted in said housing for entering a closed tube;

a tube drive mounted in said housing for moving a tube from a carriage tube passage in said sampling position into engagement with said needle means and return;

a first lever pivotally mounted in said housing and movable through said carriage;

a snap action lever drive for said first lever for urging said lever to a first position and to a second position, with said first lever blocking said first tube passage when in a first position and retaining a tube in said first tube passage when in a second position;

a second lever pivotally mounted in said housing and movable through said carriage; and a snap action lever drive for said second lever for urging said lever to a first position and to a second position, with said second lever blocking said second tube passage when in a first position and retaining a tube in said second tube passage when in a second position, said carriage including means for engaging each of said levers to move the lever from the second position to the first position as said carriage slides, and with each of said levers being moved from the first position to the second position by impact of a tube;

each of said snap action lever drives including an urge-to-first-position spring and an urge-to-second-position spring in substantially parallel spaced relation with one end of each spring mounted in said housing and the other end of each spring engaging the lever to provide a bistable drive, and when the lever is in said first position with said urge-to-second-position spring disposed substantially on center.

13. In a mechanism for handling samples in closed tubes, the combination of:

a housing;

a tube carriage slidably mounted in said housing for reciprocation between a first position and a second position, said carriage including first and second tube passages therethrough, said tube carriage including pistons at each end riding in cylinders in said housing for reciprocation of said carriage by introduction of fluid under pressure into the appropriate cylinder, said housing including a third tube passage aligned with said first tube passage when said carriage is in said first position and a fourth tube passage aligned with said second tube passage when said carriage is in said second position, with the unaligned carriage passage in a sampling position;

needle means mounted in said housing for entering a closed tube;

a tube drive mounted in said housing for moving a tube from a carriage tube passage in said sampling position into engagement with said needle means and return;

a first lever pivotally mounted in said housing and movable through said carriage, with said lever blocking said first tube passage when in a first position and retaining a tube in said first tube passage when in a second position; and a second lever pivotally mounted in said housing and movable through said carriage, with said lever blocking said second tube passage when in a first position and retaining a tube in said second tube passage when in a second position.

14. In a mechanism for handling samples in closed tubes, the combination of:

a housing;

a tube carriage slidably mounted in said housing for reciprocation between a first position and a second position, said carriage including first and second tube passages therethrough, said housing including a third tube passage aligned with said first tube passage when said carriage is in said first position and a fourth tube passage aligned with said second tube passage when said carriage is in said second position, with the unaligned carriage passage in a sampling position;

needle means mounted in said housing for entering a closed tube;

a tube drive mounted in said housing for moving a tube from a carriage tube passage in said sampling position into engagement with said needle means and return;

a first lever pivotally mounted in said housing and movable through said carriage, with said lever blocking said first tube passage when in first position and retaining a tube in said first tube passage when in a second position;

a second lever pivotally mounted in said housing and movable through said carriage, with said lever blocking said second tube passage when in a first position and retaining a tube in said second tube passage when in a second position;

a first control switch mounted in said housing for actuation by said first lever when said lever is in said second position; and a second control switch mounted in said housing for actuation by said carriage when said carriage is in said second position.

15. In a mechanism for handling samples in closed tubes, the combination of:

a housing;

a tube carriage slidably mounted in said housing for reciprocation between a first position and a second position, said carriage including first and second tube passages therethrough, said housing including a third tube passage aligned with said first tube passage when said carriage is in said first position and a fourth tube passage aligned with said second tube passage when said carriage is in said second position, with the unaligned carriage passage in a sampling position;

needle means mounted in said housing for entering a closed tube;

drive means mounted in said housing for engaging said needle means and a tube of a carriage tube passage in said sampling position;

a first lever pivotally mounted in said housing and movable through said carriage, with said lever blocking said first tube passage when in a first position and retaining a tube in said first tube passage when in a second position; and a second lever pivotally mounted in said housing and movable through said carriage, with said lever blocking said second tube passage when in a first position and retaining a tube in said second tube passage when in a second position.

16. In a mechanism for handling samples in closed tubes, the combination of:

a housing;

a tube carriage slidably mounted in said housing for reciprocation between a first position and a second position and having a tube passage therethrough, said housing including a tube passage aligned with said carriage tube passage when said carriage is in said first position, with the carriage passage in a sampling position when in said second position;

needle means mounted in said housing for entering a closed tube;

drive means mounted in said housing for engaging said needle means and a tube of a carriage tube passage in said sampling position; and a lever pivotally mounted in said housing and movable through said carriage, with said lever blocking said tube passage when in a first position and retaining a tube in said tube passage when in a second position.

17. In a mechanism for handling samples in closed tubes, the combination of:

a housing;

a tube carriage slidably mounted in said housing for reciprocation between a first position and a second position and having a tube passage therethrough, said housing including a tube passage aligned with said carriage tube passage when said carriage is in said first position, with the carriage passage in a sampling position when in said second position;

needle means mounted in said housing for entering a closed tube; and drive means mounted in said housing for engaging said needle means and a tube of a carriage tube passage in said sampling position.

18. In a mechanism for handling samples in closed tubes, the combination of:

a housing;

a tube carriage slidably mounted in said housing for reciprocation between a first position and a second position, said carriage including first and second tube passages therethrough, said housing including a third tube passage aligned with said first tube passage when said carriage is in said first position and a fourth tube passage aligned with said second tube passage when said carriage is in said second position, with the unaligned carriage passage in a sampling position;

needle means mounted in said housing for entering a closed tube; and drive means mounted in said housing for engaging said needle means and a tube of a carriage tube passage in said sampling position.

References Cited

UNITED STATES PATENTS

| | | | |
|---|---|---|---|
| 2,893,660 | 7/1959 | Cook et al. | 243—16 |
| 3,072,362 | 1/1963 | Allen | 243—35 |
| 3,080,136 | 3/1963 | Kelley et al. | 243—34 |

MORRIS O. WOLK, *Primary Examiner.*

R. M. REESE, *Assistant Examiner.*

U.S. Cl. X.R.

141—130; 73—423